United States Patent
Zhuo

(10) Patent No.: US 9,802,583 B2
(45) Date of Patent: Oct. 31, 2017

(54) PORTABLE CLEANING DEVICE

(71) Applicant: KUNSHAN HANYUAN ELECTRONIC TECH CO., LTD, Suzhou (CN)

(72) Inventor: Zijun Zhuo, Suzhou (CN)

(73) Assignee: KUNSHAN HANYUAN ELECTRONIC TECH CO., LTD., Suzhou (CN)

( * ) Notice: Subject to any disclaimer, the term of this patent is extended or adjusted under 35 U.S.C. 154(b) by 0 days.

(21) Appl. No.: 14/573,947

(22) Filed: Dec. 17, 2014

(65) Prior Publication Data

US 2016/0039393 A1   Feb. 11, 2016

(30) Foreign Application Priority Data

Aug. 8, 2014 (CN) .......................... 2014 1 0389037

(51) Int. Cl.
*B60S 3/06* (2006.01)
*A46B 17/06* (2006.01)
*B08B 1/04* (2006.01)
*B60S 3/04* (2006.01)
*B60S 3/00* (2006.01)

(52) U.S. Cl.
CPC .............. *B60S 3/063* (2013.01); *A46B 17/06* (2013.01); *B08B 1/04* (2013.01); *B60S 3/002* (2013.01); *B60S 3/045* (2013.01); *A46B 2200/3046* (2013.01)

(58) Field of Classification Search
CPC combination set(s) only.
See application file for complete search history.

(56) References Cited

U.S. PATENT DOCUMENTS 2,796,617 A * 6/1957 Bradshaw ............... A47L 13/60
100/211
3,129,451 A * 4/1964 Colaianni ................ A46D 9/04
134/107
4,135,269 A * 1/1979 Marston .................. A47L 13/58
15/262

(Continued)

FOREIGN PATENT DOCUMENTS

CN   201572064 U   9/2010
CN   203996140 U   12/2014

(Continued)

OTHER PUBLICATIONS

European Patent Office (EPO) Search Report for EP14192622 (related application), dated Mar. 9, 2015.

(Continued)

*Primary Examiner* — David Walczak
(74) *Attorney, Agent, or Firm* — Zareefa B. Flener; Flener IP Law

(57) ABSTRACT

A portable car-cleaning device, which comprises a cleaning brush and at least one water storage chamber with a water inlet, the at least one chamber being provided with at least one washing dewatering device that includes two oppositely disposed rollers, the cleaning brush being interposed between the two rollers for washing and dewatering. The car-cleaning device is simple in structure and convenient to carry, and convenient in washing and dewatering the cleaning brush, making a car washed faster, improving the washing efficiency.

8 Claims, 5 Drawing Sheets

(56) References Cited

U.S. PATENT DOCUMENTS

| | | | |
|---|---|---|---|
| 4,143,792 A | 3/1979 | Rex | |
| 4,172,542 A * | 10/1979 | Lankford | A45F 5/00 15/114 |
| 6,390,705 B1 * | 5/2002 | Dailey | B44D 3/14 220/23.2 |
| 9,247,860 B2 * | 2/2016 | Albright | A47L 21/04 |

FOREIGN PATENT DOCUMENTS

| | | |
|---|---|---|
| DE | 29718958 U1 | 12/1997 |
| JP | 8-285447 A | 11/1996 |

OTHER PUBLICATIONS

Office Action in CN 201410389037.8.
Search Report in CN 201410389037.8.

\* cited by examiner

PORTABLE CLEANING DEVICE

FIELD OF THE INVENTION

The present invention relates to the field of cleaning device technology, specially to a portable car-cleaning device.

BACKGROUND OF THE INVENTION

Cleaning a vehicle, especially a small vehicle, particularly a car, has currently become a regular job. In the case of a very dirty vehicle, it generally needs to be washed in a car wash area. A cotton brush containing no water is also usually placed in a car for regular cleaning; however, such a brush is easy to get dirty and inconvenient to be cleaned.

CONTENTS OF THE INVENTION

In order to solve the above problems, a purpose of the present invention is to provide a portable car-cleaning device, which is simple in structure and convenient to carry, allowing a car to be cleaned at any time.

In order to solve the problems in the prior art, a technical solution provide by the present invention is as follows:

A portable car-cleaning device, comprising a cleaning brush and at least one water storage chamber with a water inlet, at least one the water storage chamber being provided with at least one washing dewatering device that includes two oppositely disposed rollers, the cleaning brush being interposed between the two rollers for washing and dewatering.

Preferably, the water storage chamber includes at least two water storage rooms interconnected through a partition, each of the water storage rooms being provided with at least one the washing dewatering device.

Preferably, the water storage chamber includes a cleaning-brush washing room and a water reservoir interconnected through a partition, the cleaning-brush washing room communicating with the water reservoir through a first water pipe; the cleaning-brush washing room is provided inside with at least one the washing dewatering device; the water reservoir is provided with a compressed air device and a second water pipe, the second water pipe being connected to the first water pipe through a switch, the compressed air device pressing water in the water reservoir into the cleaning-brush washing room when the switch is opened.

Furthermore, the water inlet of the water storage room or the cleaning-brush washing room is provided with a first upper cover, the cleaning brush comprising a brush body, a plurality of cleaning heads disposed on the brush body and a handle, the handle stretching out of the first upper cover.

Furthermore, the brush body is a rectangular plate-like body with the cleaning heads disposed on both sides thereof; the washing dewatering device includes two cylindrical third rollers; the water storage room or the cleaning-brush washing room is provided with two oppositely disposed third roller shafts on a sidewall in the width direction of the brush body, the third roller being sleeved on the third roller shaft, the cleaning brush being interposed between the two third rollers, the distance from the brush body to the third roller being less than the length of the cleaning head.

Furthermore, the brush body is cylindrical, the cleaning heads being uniformly disposed axially along the brush body; the washing dewatering device comprises a first roller and a second roller, which are a cylinder taking a semicircle as a generating line and sleeved on a first roller shaft and a second roller shaft fixed on a sidewall of the water storage room or the cleaning-brush washing room; the first roller and the second roller are assembled into a circular through slot, inside which is accommodated the cleaning brush, the diameter of the through slot being greater than the diameter of the brush body but less than the outer diameter of the cleaning brush.

Furthermore, the water storage room is further provided on both sides with a carrying handle.

Furthermore, the water reservoir is provided above the water inlet with a second upper cover, the compressed air device going longitudinally through and assembled integrally with the second upper cover, the second upper cover being removably sealingly connected with an upper portion of the water reservoir.

Furthermore, the compressed air device comprises an air reservoir disposed in the water reservoir, and a handgrip disposed on the second upper cover, a piston rod and a piston, the piston rod being connected on one end with the handgrip and connected on the other end with the piston, the piston being disposed in the air reservoir.

Furthermore, the water reservoir is also provided above with a grip portion.

Compared with the prior art, the present invention has the following advantages:

1. With the technical solution of the present invention, this cleaning device is simple in structure and convenient to carry, suitable for use on board; the cleaning-brush washing room provided on it can be used to store water, enabling a car to be cleaned in the case of inconvenient access to water, and the water stored in the cleaning device can be used repeatedly, having a good water-saving effect.

2. With the technical solution of the present invention, a washing dewatering device is disposed in the cleaning-brush washing room or the water storage room, and the washing dewatering device is made to include two oppositely disposed rollers; while the cleaning brush is pulled up and down between the two rollers, the roller squeezes the cleaning head of the cleaning brush for cleaning and dewatering, which facilitates cleaning the car by the cleaning brush and is convenient and fast, improving the cleaning efficiency.

3. With the further technical solution of the present invention, a water pipe is disposed between the cleaning-brush washing room and the water reservoir; when the water in the cleaning-brush washing room is dirty, it can be poured out through the water inlet, and then the clean water in the water reservoir is pressed by the compressed air device into the cleaning-brush washing room for use, making it not necessary to provide a cleaning dewatering device in each of the water storage rooms, thus simplifying the structure of this cleaning device.

BRIEF DESCRIPTION OF THE DRAWINGS

In order to explain the technical solutions of the examples of the present invention more clearly, the drawings needing to be used in the examples will be simply described in the following. The following drawings are only some examples of the present invention. For those of ordinary skill in the art, other drawings can also be obtained based on these drawings without making effort.

Wherein: 1. cleaning brush; 11. handle; 12. brush body; 13. cleaning head; 2. water storage room; 21. washing dewatering device; 211. first roller; 212. second roller; 213. first roller shaft; 214. second roller shaft; 215. third roller shaft; 216. third roller; 22. first upper cover; 23. partition; 3. carrying handle; 4. cleaning-brush washing room; 5. water reservoir; 51. second upper cover; 52. air reservoir; 53. handgrip; 54. second water pipe; 55. first water pipe; 56. switch; and 57. grip portion.

DETAILED DESCRIPTION OF THE EMBODIMENTS

The above solutions will be further described below with reference to specific examples. It should be understood that these examples are intended to illustrate the present invention without limiting the scope thereof. The implementation conditions employed in the examples can be further adjusted according to conditions of a specific manufacturer, the implementation conditions not indicated being usually the routine experimental conditions.

Figure 1:
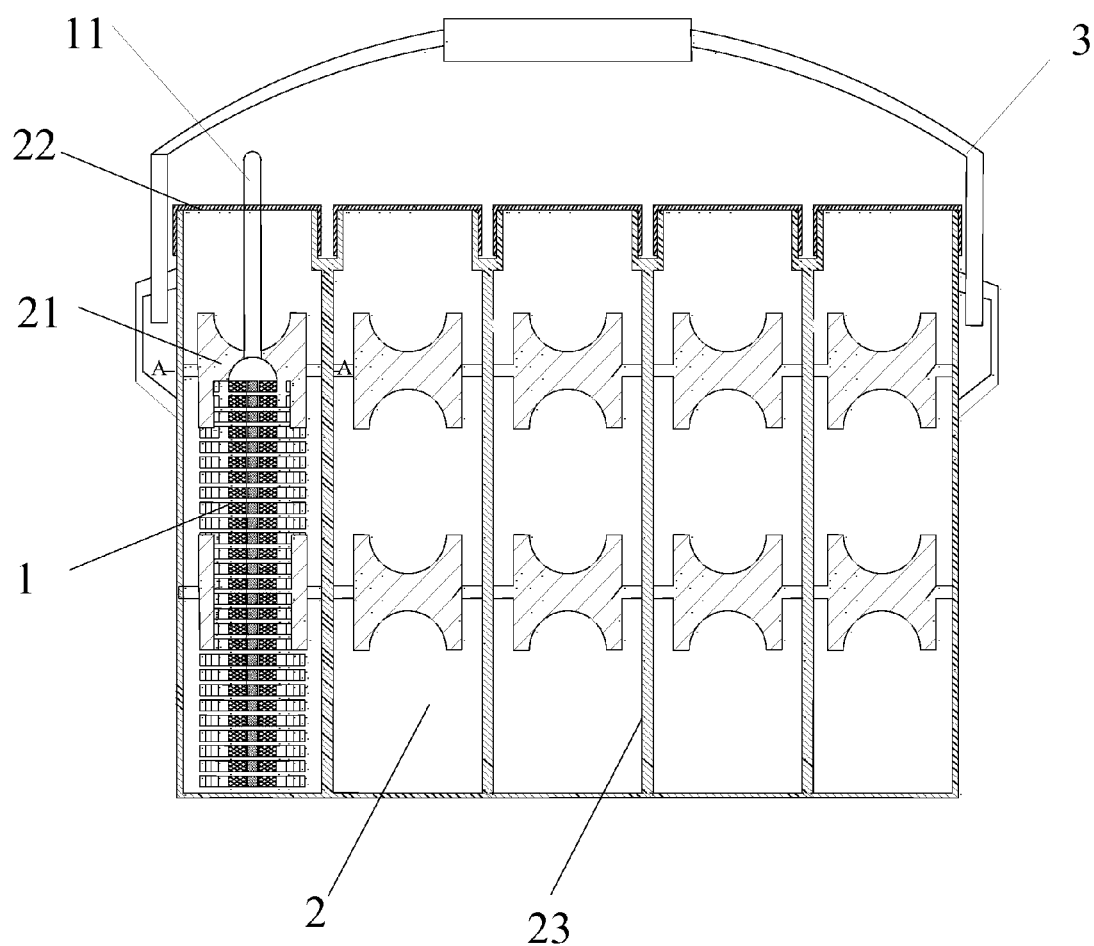
FIG. 1 is a structural schematic view of Example 1 of a portable car-cleaning device of the present invention.
Figure 2:
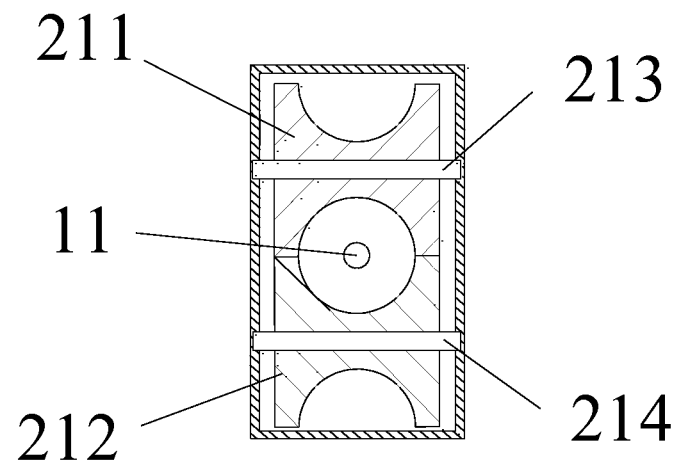
FIG. 2 is a sectional view along the line A-A in FIG. 1.
Figure 3:
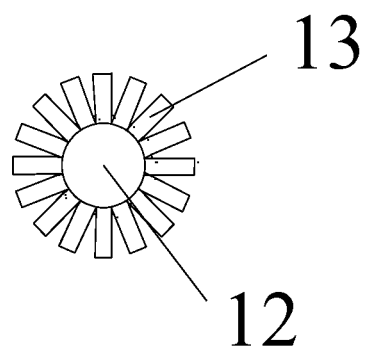
FIG. 3 is a sectional schematic view of the cleaning brush in FIG. 1.

FIGS. 1-3 are structural schematic views of Example 1 of a portable car-cleaning device of the present invention, which comprises a cleaning brush 1 and at least two water storage rooms 2 used for accommodating the cleaning brush 1, there being five water storage rooms 2 shown in the drawing; it is necessary to explain that the number of the water storage room 2 can be set as practically required, which is not defined here in the present invention; the cleaning brush 1 comprises a brush body 12 and a plurality of cleaning heads 13 disposed on the brush body 12, and the five water storage rooms 2 are interconnected through a partition 23; the water storage room 2 is a chamber with a water inlet, which is provided with a first upper cover 22; in order to facilitate the cleaning and dewatering operation on the cleaning brush 1, the cleaning brush 1 is provided on the brush body 12 with a handle 11, which stretches out of the first upper cover 22.

The water storage room 2 is provided inside with at least one washing dewatering device 21; in order to improve the cleaning and dewatering effect on the cleaning brush 1, the number of the washing dewatering device 21 can be set as practically required, the water storage room 2 in this example being provided inside with two washing dewatering devices 21 up and down.

As shown in FIG. 3, the brush body 12 of the cleaning brush 1 in this example is cylindrical, and the cleaning heads 13 are uniformly disposed axially along the brush body 12; the washing dewatering device 21 in the water storage room 2 is set according to the shape of the cleaning brush 1, and comprises a first roller 211 and a second roller 212, which are a cylinder taking a semicircle as a generating line and sleeved on a first roller shaft 213 and a second roller shaft 214 fixed on the sidewall of the water storage room 2; the first roller 211 and the second roller 212 can be assembled into a circular through slot, whose diameter is greater than the diameter of the brush body 12 of the cleaning brush 1 and less than the outer diameter of the cleaning brush 1, the outer diameter of the cleaning brush 1 here referring to the longest distance between the two cleaning heads 13 oppositely disposed on the brush body 12. In the process of inserting the cleaning brush 1 into the circular through slot and pulling it up and down back and forth, the first roller 211 and the second roller 212 rotate along the first roller shaft 213 and the second roller shaft 214, which can produce a squeezing effect on the cleaning head 13, and thus the washing dewatering device 21 located at the lower portion sufficiently washes the cleaning brush 1, while the washing dewatering device 21 located at the upper portion dehydrates the cleaning brush 1 having been washed to facilitate the following car cleaning.

In order to facilitate moving this car-cleaning device, the water storage room 2 is provided on both sides with a carrying handle 3, which is convenient for a user to move this car-cleaning device.

Figure 4:
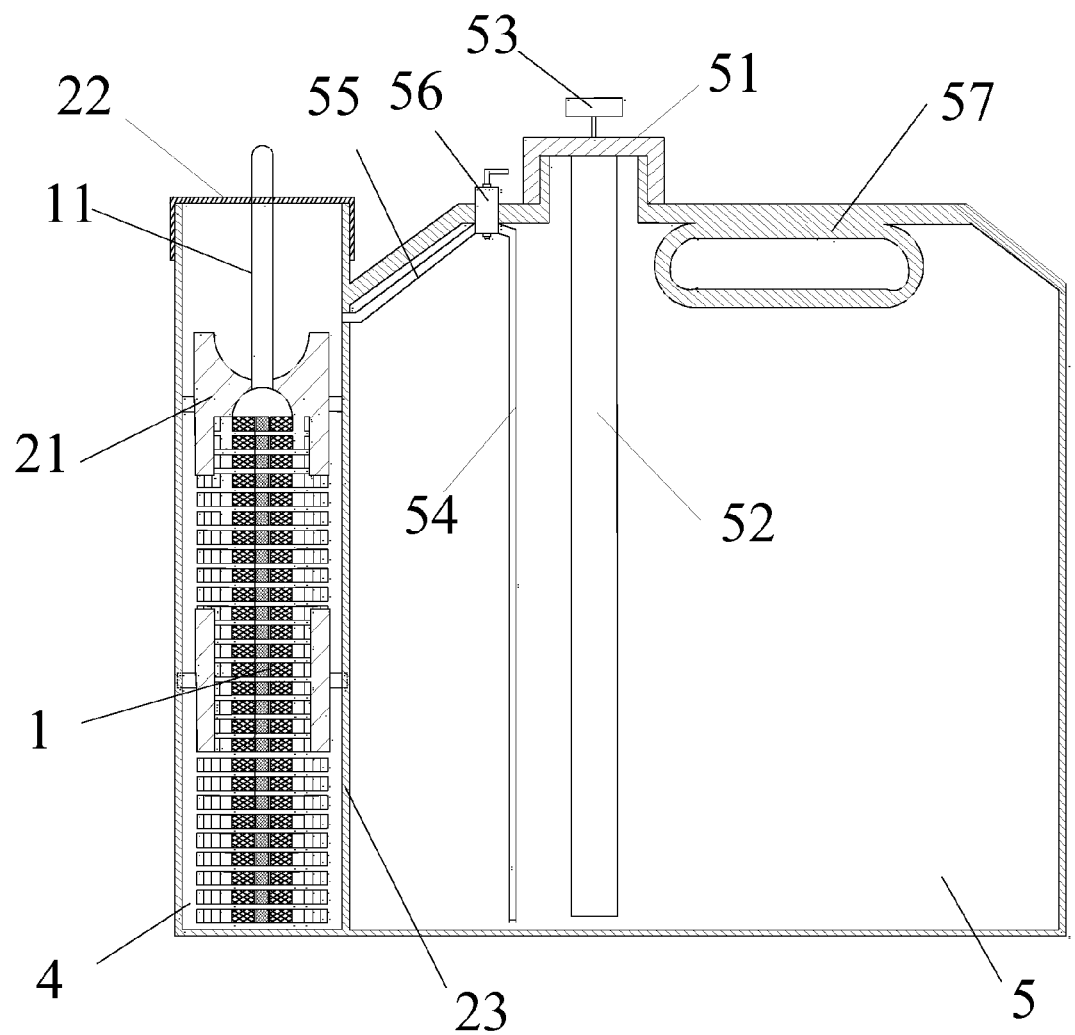
FIG. 4 is a structural schematic view of Example 2 of the present invention.

As shown in FIG. 4, in order to simplify the structure of the car-cleaning device, a more compact, convenient and rapid cleaning device is provided in the second example of the present invention, comprising a cleaning brush 1, a cleaning-brush washing room 4, and a water reservoir 5 connected with the cleaning-brush washing room 4 through a partition 23, both the cleaning-brush washing room 4 and the water reservoir 5 being a chamber with a water inlet; wherein the water inlet of the water reservoir 5 is sealed, and the cleaning-brush washing room 4 communicates with the water reservoir 5 through a first water pipe 55 and is provided inside with at least one washing dewatering device 21, there being two washing dewatering devices 21 provided up and down in this example; the water reservoir 5 is further provided with a compressed air device and a second water pipe 54, the water inlet of the second water pipe 54 being disposed as close as possible to the bottom of the water reservoir 5, the second water pipe 54 being connected to the first water pipe 55 through a switch 56; after the dirty water in the cleaning-brush washing room 4 is discharged, the switch 56 is opened, and the clean water in the water reservoir 5 can be pressed by the compressed air device into the cleaning-brush washing room 4 through the second water pipe 54 and the first water pipe 55.

Specifically, the water reservoir 5 is provided above the water inlet with a second upper cover 51, the compressed air device going longitudinally through and assembled integrally with the second upper cover 51; when the water reservoir 5 is full of water as usual, the second upper cover 51 and the upper portion of the water reservoir 5 are sealingly interconnected; when water needs to be added to the water reservoir, the second upper cover 51 can be disassembled.

The compressed air device comprises an air reservoir 52, a handgrip 53, a piston rod and a piston, wherein the air reservoir 52 is disposed inside the water reservoir 5, the handgrip 53 is disposed on the second upper cover 51, the piston is disposed inside the air reservoir 52, the piston rod is connected on one end with the handgrip 53 and on the other end with the piston, and thus air pressure can be applied into the water reservoir 5 by pressing the handgrip 53 and further pushing the piston in the air reservoir 52, thereby pressing the clean water in the water reservoir 5 into the cleaning-brush washing room 4 under the action of the air pressure.

In order to facilitate moving this car-cleaning device, the water reservoir 5 is provided at the upper portion with a grip portion 57.

In this example, the brush body 12 of the cleaning brush 1 is cylindrical, and the cleaning heads 13 are uniformly disposed axially along the brush body 12; the washing dewatering device 21 in the cleaning-brush washing room 4 is set according to the shape of the cleaning brush 1, and comprises a first roller 211 and a second roller 212, which are a cylinder taking a semicircle as a generating line and sleeved on a first roller shaft 213 and a second roller shaft 214 fixed on the sidewall of the cleaning-brush washing room 4; the first roller 211 and the second roller 212 can be assembled into a circular through slot, whose diameter is greater than the diameter of the brush body 12 of the cleaning brush 1 and less than the outer diameter of the cleaning brush 1, the outer diameter of the cleaning brush 1 here referring to the longest distance between the two cleaning heads 13 oppositely disposed on the brush body 12. In the process of inserting the cleaning brush 1 into the circular through slot and pulling it up and down back and forth, the first roller 211 and the second roller 212 rotate along the first roller shaft 213 and the second roller shaft 214, which can produce a squeezing effect on the cleaning head 13, and thus the washing dewatering device 21 located at the lower portion sufficiently washes the cleaning brush 1, while the washing dewatering device 21 located at the upper portion dehydrates the cleaning brush 1 having been washed to facilitate the following car cleaning.

Figure 5:
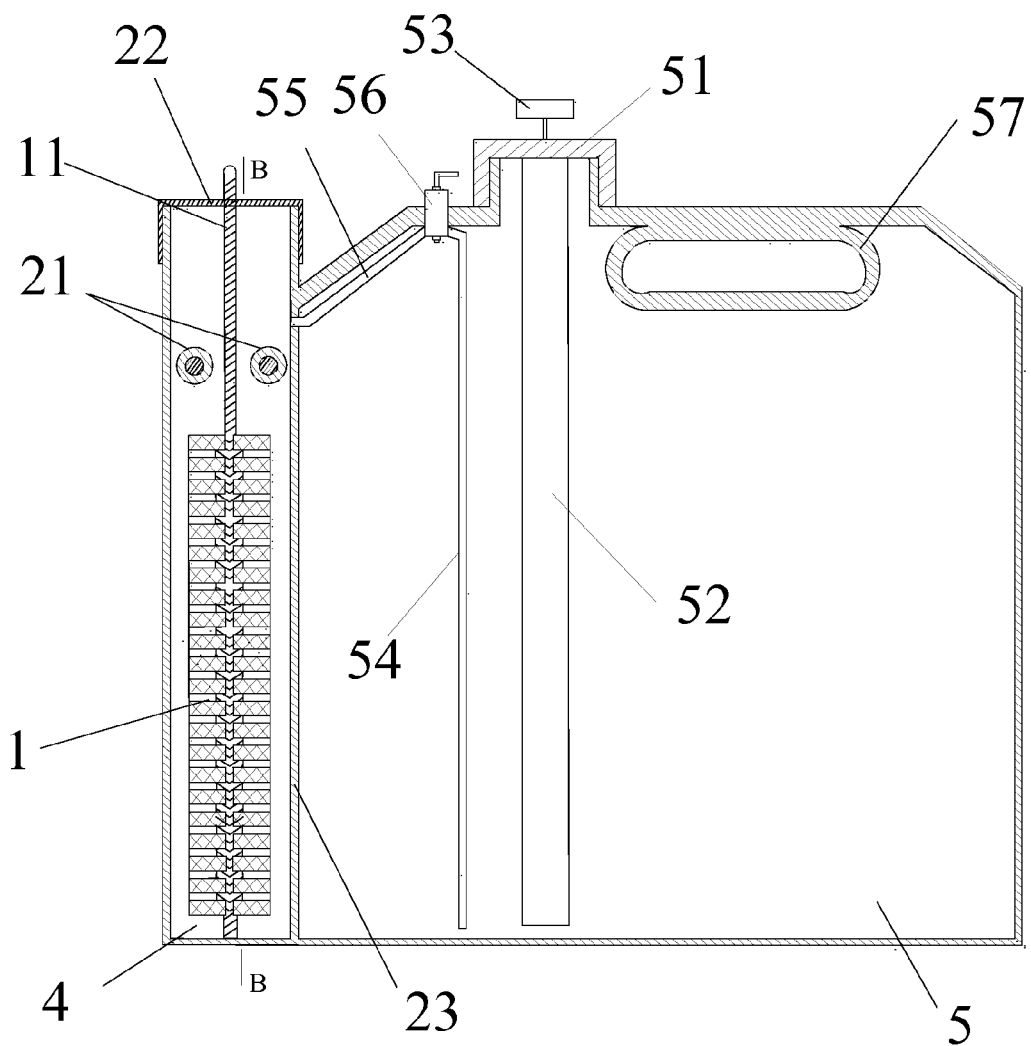
FIG. 5 is a structural schematic view of Example 3 of the present invention.
Figure 6:
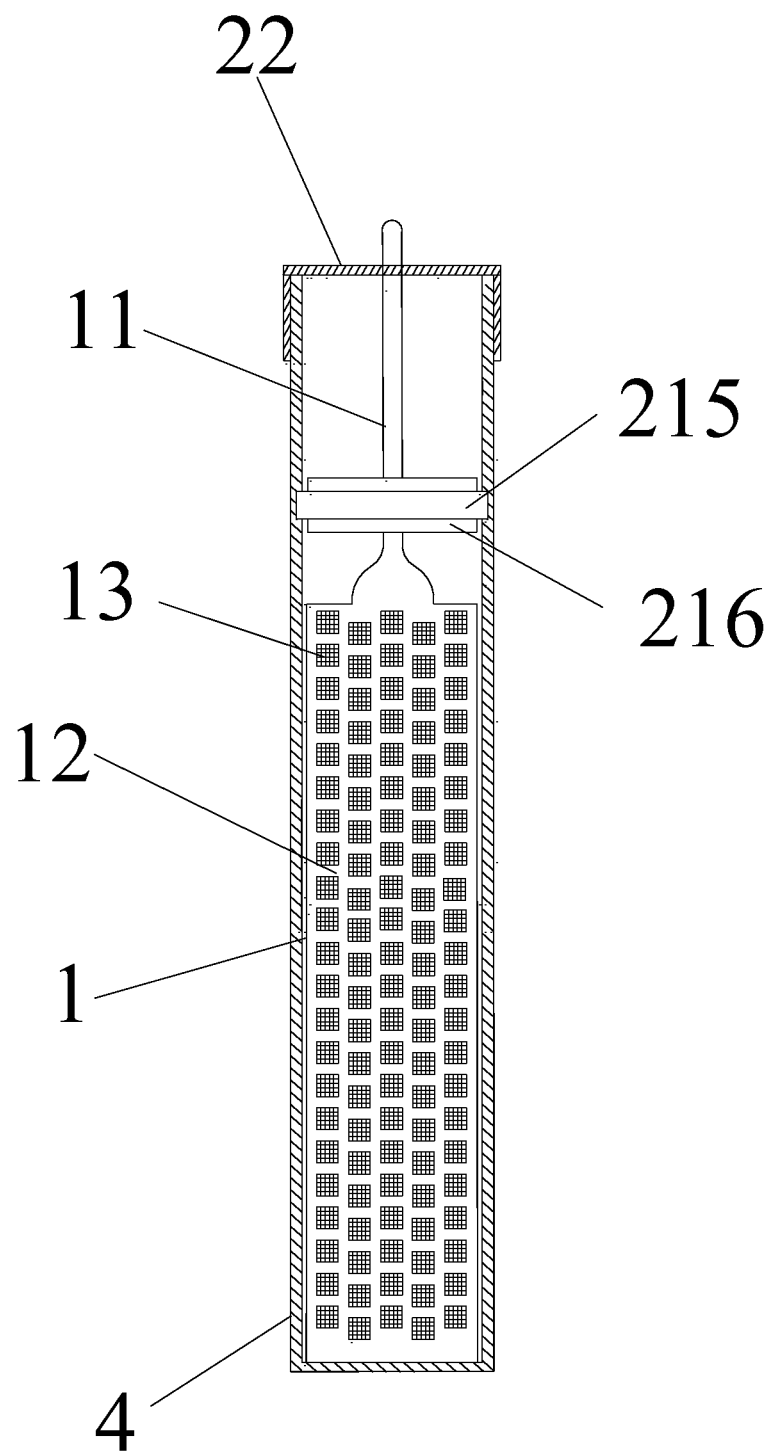
FIG. 6 is a sectional view along the line B-B in FIG. 5.

As shown in FIGS. 5-6, in order to facilitate using the cleaning brushes of different shape, Example 3 of the present invention is all the same with Example 2, except that in this example the brush body 12 of the cleaning brush 1 is a rectangular plate-like body, the cleaning heads 13 are disposed on both sides of the brush body 12, and the cleaning-brush washing room 4 is provided in the width direction of the brush body 12 with at least one washing dewatering device 21; in this example, the cleaning-brush washing room 4 is provided at the central sidewall with one group of the third roller shafts 215, and two of them are disposed oppositely in parallel; then the third roller 216 is sleeved onto the third roller shaft 215 to be used as the washing dewatering device 21, and the cleaning brush 1 is interposed between these two third roller shafts 215, with the distance between the brush body 12 and the third roller 216 being less than the length of the cleaning head 13; this third roller 216 is cylindrical, allowing the cleaning brush 1 to be placed inside the cleaning-brush washing room 4 to be pulled up and down back and forth, and the two third rollers 216 can produce a pressing effect on the cleaning head 13, thus cleaning and dewatering the cleaning head 13.

Certainly, the washing dewatering device in Example 3 can also be disposed in the water storage room in Example 1 as required, so as to facilitate applicability to the cleaning brushes of different shape.

The above examples are used only for explaining the technical concept and characteristics of the present invention. They are provided to make those skilled in the art understand the present invention and implement it, rather than limit the scope of protection of the present invention. Any equivalent alteration or modification made according to the spiritual essence of the present invention should fall within the scope of protection of the present invention.

I claim:

1. A portable car-cleaning device comprising:
   a cleaning brush and at least one water storage chamber with a water inlet, the at least one water storage chamber comprising at least one washing dewatering device having two oppositely disposed rollers, wherein the cleaning brush is interposed between the two rollers for washing and dewatering;
   wherein the water storage chamber further comprises a cleaning-brush washing room and a water reservoir interconnected through a partition, the cleaning-brush washing room communicating with the water reservoir through a first water pipe; wherein the cleaning-brush washing room having the at least one washing dewatering device inside; wherein the water reservoir has a compressed air device and a second water pipe, the second water pipe being connected to the first water pipe through a switch, the compressed air device configured to press water in the water reservoir into the cleaning-brush washing room when the switch is opened.

2. The portable car-cleaning device according to claim 1, wherein a water inlet of the cleaning brush wash room is provided with a first upper cover, and the cleaning brush comprises a brush body, a plurality of cleaning heads disposed on the brush body, and a handle, the handle stretching out of the first upper cover.

3. The portable car-cleaning device according to claim 2, wherein the brush body is a rectangular plate-like body with the cleaning heads disposed on both sides thereof; said two oppositely disposed rollers are two cylindrical third rollers; the water storage room is provided with two oppositely disposed third roller shafts on a sidewall in the width direction of the brush body, each of the third rollers being sleeved onto a respective third roller shaft, the cleaning brush being interposed between the two third rollers, the distance from the brush body to the third roller being less than the length of the cleaning head.

4. The portable car-cleaning device according to claim 3, wherein the water reservoir is provided above the water inlet with a second upper cover, the compressed air device going longitudinally through and assembled integrally with a second upper cover, the second upper cover being removably sealingly connected with an upper portion of the water reservoir.

5. The portable car-cleaning device according to claim 4, wherein the compressed air device comprises an air reservoir disposed in the water reservoir, a handgrip is disposed on the second upper cover, a piston rod and a piston, wherein the piston rod is connected on one end with the handgrip and connected on the other end with the piston, and wherein the piston is disposed in the air reservoir.

6. The portable car-cleaning device according to claim 5, wherein the water reservoir is further provided above with a grip portion.

7. The portable car-cleaning device according to claim 2, wherein the brush body is cylindrical, and the cleaning heads are uniformly disposed axially along the brush body; wherein the washing dewatering device comprises a first roller and a second roller, each of which is a cylinder taking a semi-circle as a generating line and sleeved onto a respective roller shaft fixed on a sidewall of the cleaning-brush washing room; wherein the first roller and the second roller are assembled into a circular through slot, inside which is accommodated the cleaning brush, the diameter of the through slot being greater than the diameter of the brush body but less than the outer diameter of the cleaning brush.

8. The portable car-cleaning device according to claim 1, wherein said water storage chamber is further provided with a carrying handle.

\* \* \* \* \*